(12) United States Patent
Bowers

(10) Patent No.: US 6,508,500 B2
(45) Date of Patent: Jan. 21, 2003

(54) INTEGRATED SEAT BELT AND SEAT SUPPORT

(75) Inventor: Paul A. Bowers, Ray, MI (US)

(73) Assignee: TRW Vehicle Safety Systems Inc., Lyndhurst, OH (US)

(*) Notice: Subject to any disclaimer, the term of this patent is extended or adjusted under 35 U.S.C. 154(b) by 0 days.

(21) Appl. No.: 09/772,053

(22) Filed: Jan. 29, 2001

(65) Prior Publication Data
US 2002/0101092 A1 Aug. 1, 2002

(51) Int. Cl.$^7$ ................................................. B60N 2/02
(52) U.S. Cl. ................ 296/68.1; 280/808; 297/216.14; 297/483
(58) Field of Search .................. 296/63, 68.1; 280/808; 297/216, 216.1, 216.13, 216.14, 216.15, 216.16, 216.18, 216.19, 468, 483

(56) References Cited

U.S. PATENT DOCUMENTS

| | | | |
|---|---|---|---|
| 2,819,095 A | | 1/1958 | Haltmar, Jr. ................. 297/468 |
| 3,561,817 A | | 2/1971 | Needham .................. 297/216.1 |
| 4,474,347 A | | 10/1984 | Hazelsky ................. 244/122 R |
| 4,585,273 A | | 4/1986 | Higgs et al. ............ 297/452.18 |
| 4,702,491 A | * | 10/1987 | Meyer ......................... 280/808 |
| 5,015,010 A | * | 5/1991 | Homeier et al. ............. 280/808 |
| 5,031,962 A | | 7/1991 | Lee .............................. 297/484 |
| 5,046,687 A | | 9/1991 | Herndon ............... 244/122 AG |
| 5,100,176 A | | 3/1992 | Ball et al. ................. 280/801.1 |
| 5,213,300 A | * | 5/1993 | Rees ............................ 248/429 |
| 5,253,924 A | * | 10/1993 | Glance ................... 297/216.13 |
| 5,390,977 A | * | 2/1995 | Miller .......................... 280/806 |
| 5,401,072 A | | 3/1995 | Farrand ...................... 296/68.1 |
| 5,570,933 A | * | 11/1996 | Rouhana et al. ............ 297/468 |
| 5,647,611 A | | 7/1997 | Boyd et al. ............... 280/801.1 |
| 5,681,081 A | * | 10/1997 | Lindner et al. ............. 280/808 |
| 5,743,597 A | * | 4/1998 | Jessup et al. ............. 280/801.2 |
| 5,895,090 A | * | 4/1999 | Farquhar et al. ......... 296/65.15 |

* cited by examiner

Primary Examiner—D. Glenn Dayoan
Assistant Examiner—Lori L Coletta
(74) Attorney, Agent, or Firm—Tarolli, Sundheim, Covell, Tummino & Szabo L.L.P.

(57) ABSTRACT

A vehicle seat (16) has a seat back portion (24) for engaging an occupant (12) of a vehicle (14). A length of seat belt webbing (18) extends around a portion of the occupant (12). A seat belt retractor (44) biases the length of seat belt webbing (18) in a belt retraction direction. The seat belt retractor (44) allows the length of seat belt webbing (18) to move in a belt withdrawal direction, opposite the belt retraction direction, when a predetermined force is applied to the length of seat belt webbing (18). A blocking mechanism (70) blocks movement of the length of seat belt webbing (18) in the withdrawal direction. The blocking mechanism (70) is actuated upon the occurrence of a vehicle collision. A portion of the length of seat belt webbing (18) restrains movement of the seat back portion (24) relative to the vehicle during a vehicle collision.

8 Claims, 2 Drawing Sheets

INTEGRATED SEAT BELT AND SEAT SUPPORT

BACKGROUND OF THE INVENTION

1. Technical Field

The present invention relates to an apparatus for helping to protect a vehicle occupant in the event of a vehicle collision. In particular, the present invention relates to restraining movement of a portion of a vehicle seat with a length of seat belt webbing in the event of a vehicle collision.

2. Description of the Prior Art

A known apparatus, as disclosed in U.S. Pat. No. 5,401,072 to Farrand, includes first and second lengths of belt webbing. The first length extends about the occupant and has opposite ends anchored to the vehicle. In the event of a vehicle collision, the occupant tends to move relative to the vehicle and is restrained by the first length of belt webbing.

The second length of belt webbing extends behind a seat back portion of the vehicle seat and has opposite ends anchored to the vehicle. In the event of a vehicle collision, the seat back portion may tend to move rearward relative to the vehicle and is restrained from rearward movement by the second length of seat belt webbing.

SUMMARY OF THE INVENTION

The present invention is an apparatus for helping to protect an occupant of a vehicle upon the occurrence of a vehicle collision. The apparatus includes a vehicle seat, a length of seat belt webbing, a seat belt retractor, and a blocking mechanism. The vehicle seat has a seat back portion for engaging the body of the occupant of the vehicle. The length of seat belt webbing extends around a portion of the occupant and helps to protect the occupant upon the occurrence of a vehicle collision. The seat belt retractor biases the length of seat belt webbing in a belt retraction direction. The seat belt retractor allows the length of seat belt webbing to move in a belt withdrawal direction when a predetermined force is applied to the length of seat belt webbing. The belt withdrawal direction is opposite the belt retraction direction. The blocking mechanism blocks movement of the length of seat belt webbing in the belt withdrawal direction. The blocking mechanism is actuated upon the occurrence of a vehicle collision. A portion of the length of seat belt webbing restrains movement of the seat back portion relative to the vehicle during a vehicle collision.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

Figure 1:
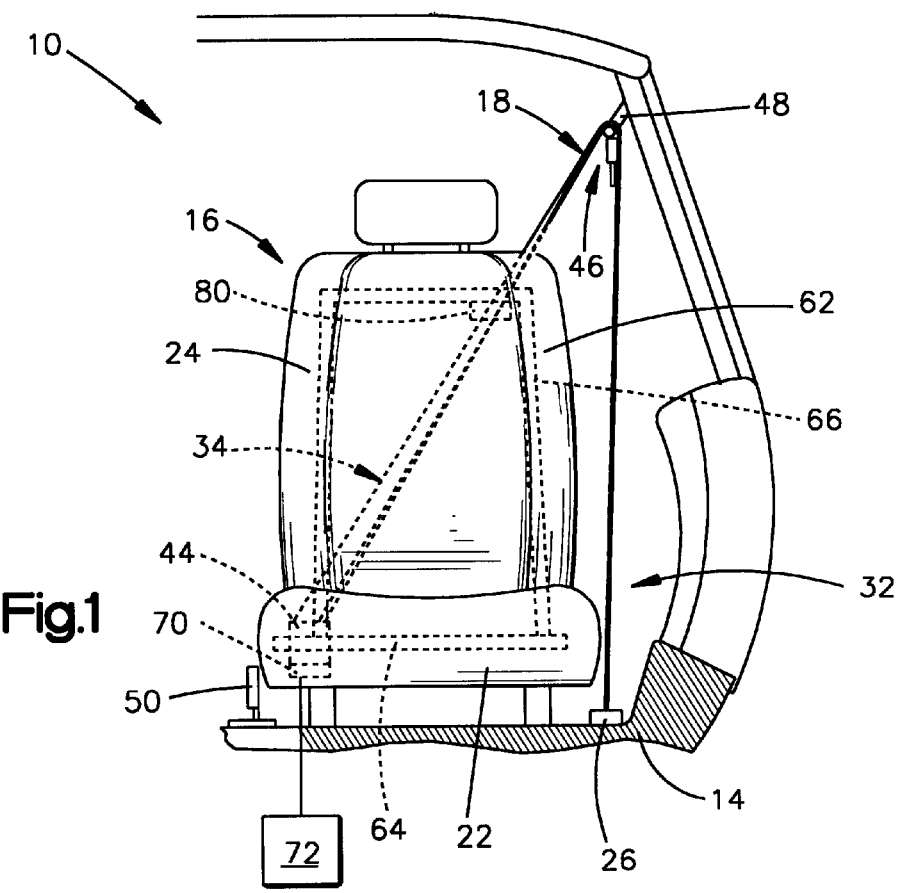
FIG. 1 is a schematic illustration of a vehicle seat belt apparatus in accordance with the present invention.
Figure 4:
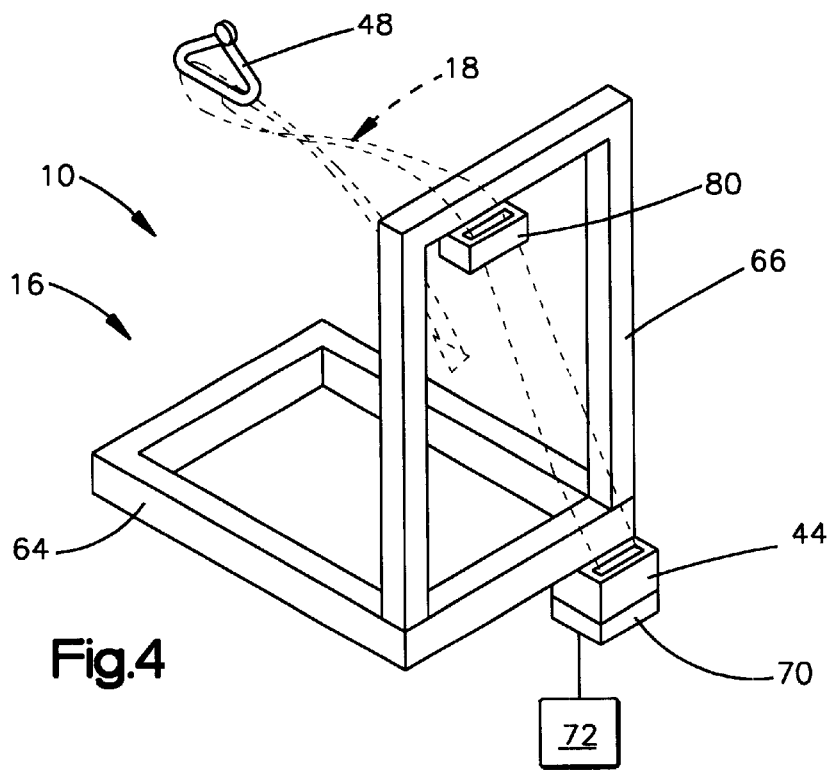
FIG. 4 is a schematic isometric view of part of the apparatus of FIG. 1.

As representative of the present invention, FIGS. 1–4 illustrate a three-point continuous loop seat belt apparatus 10 for helping to protect an occupant 12 of a vehicle 14 upon the occurrence of a vehicle collision. The occupant 12 of the vehicle 14 sits on a vehicle seat 16, which is illustrated as a front driver's seat of the vehicle. The vehicle seat 16 has a generally horizontal base portion 22 and a generally vertical back portion 24, each of which engages and supports the body of the vehicle occupant 12.

The vehicle seat 16 is adjustably fixed to the floor pan of the vehicle 14. The vehicle seat 16 may be moved forward or rearward in the vehicle 14 for accommodating occupants of different sizes and position preferences, as is known in the art.

The apparatus 10 includes a single length of seat belt webbing 18. One end 32 of the single length of seat belt webbing 18 is anchored to the vehicle 14 by an anchor 26. The opposite end 34 of the single length of seat belt webbing 18 is attached to a rotatable spool (not shown) of a seat belt retractor 44 secured to the vehicle seat 16. Intermediate its ends 32, 34, the single length of seat belt webbing 18 passes through a tongue assembly 46 and a D-ring or turning loop 48. The turning loop 48 is fixed to the vehicle 14 at a position at or above the shoulders of the vehicle occupant 12 (as viewed in FIGS. 2 and 3).

When the seat belt apparatus 10 is not in use by a vehicle occupant, a first portion of the single length of seat belt webbing 18 is oriented generally vertically on one side of the vehicle seat 16 (as viewed in FIG. 1) and extends from the anchor 26 to the turning loop 48. A second portion of the single length of seat belt webbing 18 extends from the turning loop 48 to the seat belt retractor 44.

To extend the seat belt webbing 18 about an occupant of the vehicle seat 16, the tongue assembly 46 is manually grasped by the vehicle occupant 12 in the vehicle seat 16 and is pulled across the lap and torso of the vehicle occupant. As the tongue assembly 46 is pulled across the lap and torso of the vehicle occupant 12, the tongue assembly travels, or slides, along the first portion of the single length of seat belt webbing 18. The single length of seat belt webbing 18 is also withdrawn from the seat belt retractor 44.

Figure 2:
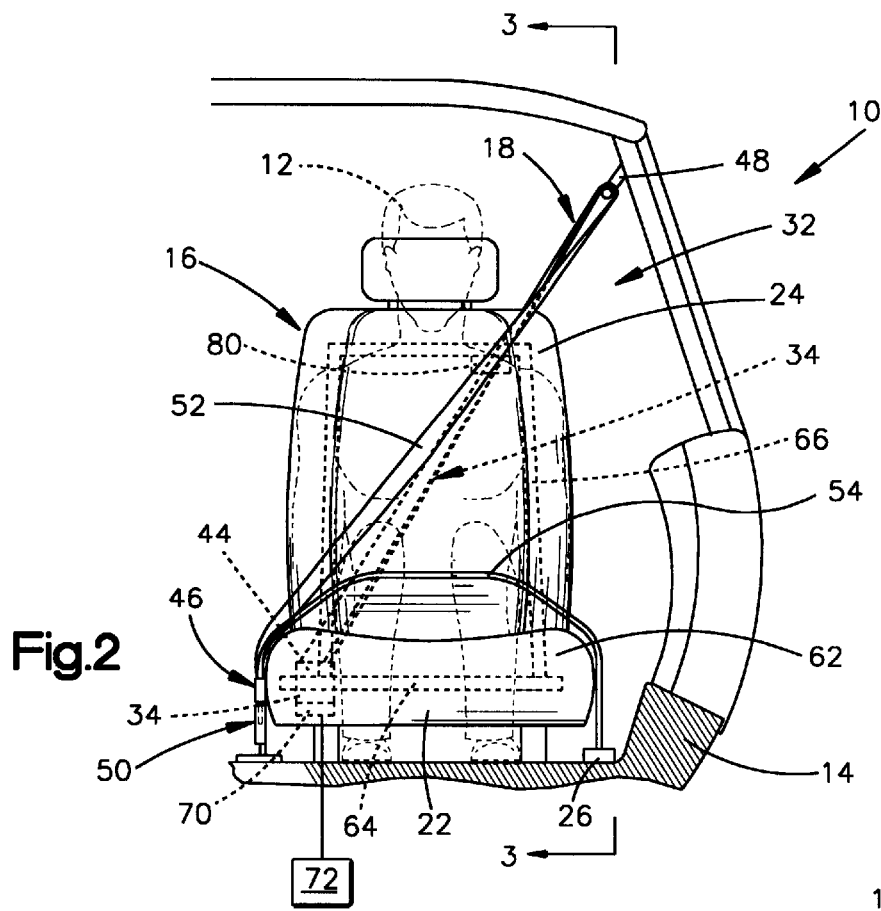
FIG. 2 is a schematic illustration of the vehicle seat belt apparatus of FIG. 1 under a different condition.
Figure 3:
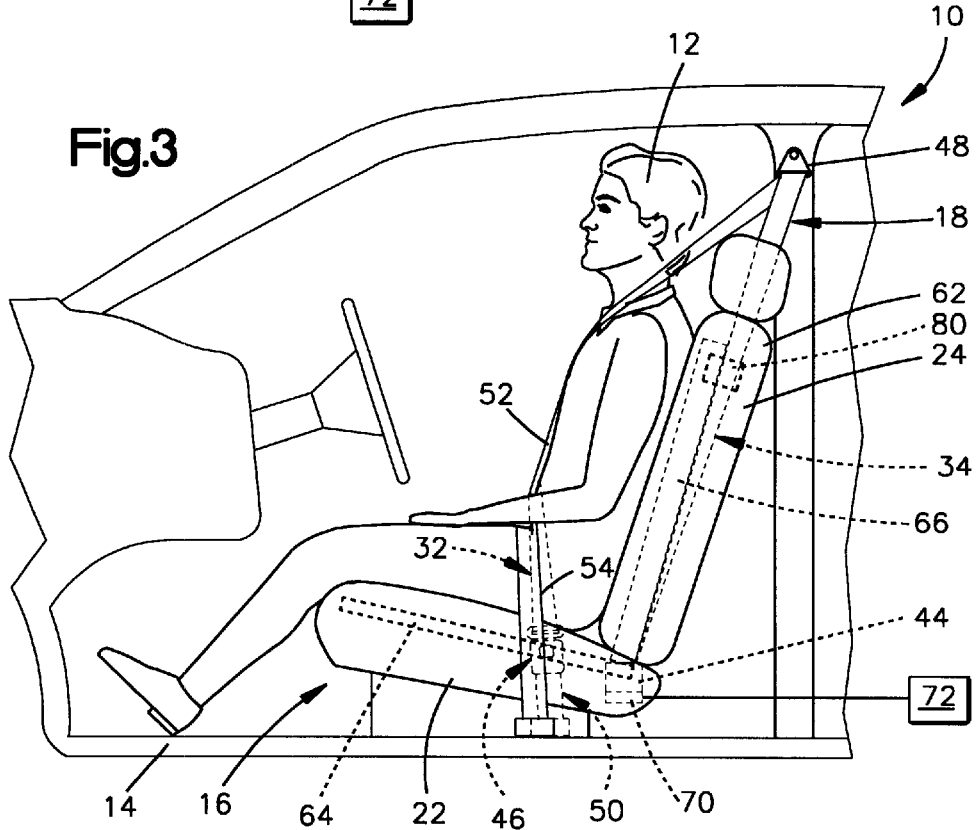
FIG. 3 is a schematic view taken along line 3—3 in FIG. 2.

When the seat belt webbing 18 has been pulled across the lap and torso of the vehicle occupant 12, the tongue assembly 46 is connected with a buckle 50 (as viewed in FIGS. 2 and 3). The buckle 50 is anchored to the vehicle 14 and disposed on the side of the vehicle seat 16 opposite the anchor 26. When the seat belt apparatus 10 is thus buckled, the single length of seat belt webbing 18 is divided by the tongue assembly 46 into a torso portion 52, which extends across the torso of the vehicle occupant 12, and a lap portion 54, which extends across the lap of the vehicle occupant.

The vehicle seat 16 includes an internal frame and a cushion 62 (FIG. 2) surrounding the internal frame. The internal frame comprises a base frame element 64 (FIG. 4) internal to the base portion 22 of the vehicle seat 16 and a back frame element 66 internal to the back portion 24 of the vehicle seat. The back frame element 66 may be fixedly secured to the base frame element 64 or, alternatively, may be rotationally adjustable relative to the base frame element for occupant convenience and comfort.

The seat belt retractor 44 includes the rotatable spool on which the single length of seat belt webbing 18 is wound. The retractor 44 may include a rewind spring assembly (not shown) that biases the spool to rotate in the belt retraction direction to wind up the single length of seat belt webbing 18, as is known in the art.

The retractor 44 is fixedly secured to the base frame element 64 at the rear of the vehicle seat 16 adjacent the side of the vehicle seat that is opposite the anchor 26 (as viewed in FIGS. 1 and 2). The retractor 44 is thus disposed on the same side of the vehicle seat 16 as the buckle 50 and on the opposite side of the vehicle seat from the anchor 26 and the turning loop 48. Alternatively, the retractor 44 may be located at the rear of the vehicle seat and at the midpoint between opposite sides of the vehicle seat 16.

The apparatus 10 also includes a mechanism, indicated schematically at 70, for blocking rotation of the retractor spool in the belt withdrawal direction, thus blocking movement of the single length of seat belt webbing 18 in the belt withdrawal direction, upon sensing a predetermined vehicle condition. Such a predetermined vehicle condition may be, for example, sudden vehicle deceleration above a predetermined deceleration or withdrawal of the single length of seat belt webbing 18 from the retractor 44 at a rate exceeding a predetermined rate, such as can occur in a vehicle collision. Such a vehicle condition can also be a side impact to the vehicle 14 or a rollover condition of the vehicle.

The blocking mechanism 70 may, for example, include a lock bar that is movable into engagement with a ratchet wheel that is rotatable with the spool of the retractor 44. When the lock bar is in engagement with the ratchet wheel, the spool can not rotate in the belt withdrawal direction.

The blocking mechanism 70 may be actuated by a sensor 72, such as an impact sensor, for sensing the occurrence of such an impact to the vehicle. The sensor 72 may be a mechanical sensor that includes a member movable upon sudden vehicle deceleration, a rear impact, a side impact, or a rollover condition to actuate the blocking mechanism. The sensor 72 may also be an electronic sensor, for example, a piezoelectric transducer or pressure sensor. The sensor 72 may also be associated with an electronic control unit that determines the existence of a vehicle condition requiring actuation of the blocking mechanism 70 on the basis of parameters including vehicle speed, engine speed, road wheel speed, occupant position, etc.

Under normal driving conditions, the blocking mechanism 70 is in an unactuated condition. The single length of seat belt webbing 18 is movable freely in a belt withdrawal direction and in the opposite belt retraction direction. When the blocking mechanism 70 is in an actuated condition and blocks movement of the single length of seat belt webbing 18 in the belt withdrawal direction, the vehicle occupant 12 is restrained by the seat belt webbing. Tensioning of the seat belt webbing occurs due to the vehicle occupant and/or vehicle seat tending to move relative to the vehicle 14.

The seat belt retractor 44 may include a pretensioner mechanism which, when actuated, rotates the retractor spool or moves the buckle 50. The retractor thus moves, or pulls, the single length of seat belt webbing 18 in the belt retraction direction, causing the seat belt webbing 18 to be tensioned around the vehicle occupant 12 and the vehicle seat 16.

The base portion 22 of the vehicle seat 16 may be adjusted forward and rearward in the vehicle 14 as appropriate for occupants of different sizes. As the adjustment of the base portion 22 takes place, the retractor 44 may pay out or take in the seat belt webbing 18. When the vehicle seat 16 is not being adjusted, the vehicle seat is fixed to the vehicle 14.

When the blocking mechanism 70 is in the actuated condition, the single length of seat belt webbing 18 is fixed at the anchor 26 at one end and is fixed at the assembly of the retractor 44, the base portion 22 of the vehicle seat 16, and the vehicle 14 at the other end. The single length of seat belt webbing 18 extends through the tongue assembly 46 (attached to the buckle 50) and the turning loop 48. The single length of seat belt webbing 18 also extends across the lap of the vehicle occupant 12, and the torso of the vehicle occupant to restraint the vehicle occupant in the vehicle seat 16. The vehicle seat 16 and the vehicle occupant 12 are both thereby supported against forward or rearward movement relative to the vehicle 14.

The seat belt webbing 18 extends behind the vehicle seat back portion 24 and, when tensioned, will resist backward movement of the vehicle seat 16 relative to the vehicle 14. During a rear end collision of the vehicle 14, the inertia of the back portion 24 of the vehicle seat 16 will tend to keep the back portion from moving forward with the vehicle, thereby resulting in rearward movement of the back portion relative to the vehicle. The second portion of the single length of seat belt webbing 18 resists this relative rearward movement and thus restrains rearward movement of the vehicle seat 16. The contact between the back portion 24 of the vehicle seat 16 and the second portion of the single length of seat belt webbing 18 creates a tension in the webbing that limits rearward movement of the vehicle seat 16. Simultaneously, the single length of seat belt webbing 18, if tensioned by a pretensioner, also forces the vehicle occupant 12 against the base and back portions 22, 24 of the vehicle seat 16.

During a front end collision of the vehicle 14, the inertia of the back portion 24 of the vehicle seat 16 will urge the back portion forward relative to the vehicle. The single length of seat belt webbing 18 resists this relative forward movement. The contact between the vehicle occupant 12 and the first portion of the single length of seat belt webbing 18 creates a tension in the webbing that limits forward movement of the vehicle seat 16. Simultaneously, the first portion of the single length of seat belt webbing 18, if tensioned by a pretensioner, forces the vehicle occupant 12 against the base and back portions 22, 24 of the vehicle seat 16.

The second portion of the single length of seat belt webbing 18 may be extended through the cushion 62 to the retractor 44, which is surrounded by the cushion as viewed in FIG. 3. This reduces the possibility that the second portion of the single length of seat belt webbing 18 may be inadvertently pulled to a position where it may inadequately restraint movement of the back portion 24 of the vehicle seat 16.

Moreover, the second portion of the single length of seat belt webbing 18 may be extended through a guide ring 80 that is fixed to an upper part of the back frame element 66. The guide ring 80 is disposed adjacent the side of the vehicle seat 16 opposite the retractor 44 and the buckle 50. Alternatively, the guide ring 80 may be disposed on the back frame element 66 at the midpoint between opposite sides of the vehicle seat 16. The guide ring 80 positions the single length of seat belt webbing 18 for acting most effectively on the seat back portion 24 of the vehicle seat 16 (i.e., extending diagonally from the upper corner to the lower opposite corner of the seat back portion).

The guide ring 80 further reduces the possibility that the second portion of the single length of seat belt webbing 18 may be inadvertently pulled to a position where it will inadequately act on the back portion 24 of the vehicle seat 16.

The retractor 44 and the guide ring 80 may alternatively be disposed external to the cushion 62 at the rear of the back portion 24 of the vehicle seat 16. While less attractive aesthetically, this alternative facilitates replacement and maintenance of the belt webbing 18 and the retractor 44.

From the above description of the invention, those skilled in the art will perceive improvements, changes and modifications in the invention. Such improvements, changes and modifications within the skill of the art are intended to be covered by the appended claims.

Having described the invention, I claim:

1. An apparatus for helping to protect an occupant of a vehicle upon the occurrence of a vehicle collision, said apparatus comprising:

a vehicle seat having a seat back portion for engaging the body of the occupant of the vehicle;

a length of seat belt webbing for extending around a portion of the occupant and helping to protect the occupant upon the occurrence of the vehicle collision;

a seat belt retractor for biasing said length of seat belt webbing in a belt retraction direction, said seat belt retractor allowing said length of seat belt webbing to move in a belt withdrawal direction when a predetermined force is applied to said length of seat belt webbing, said belt withdrawal direction being opposite said belt retraction direction, said seat belt retractor being associated with a first end of said length of seat belt webbing;

an anchor for fixing a second end of said length of seat belt webbing to the vehicle, said second end of said seat belt webbing being opposite said first end; and a mechanism to block movement of said length of seat belt webbing in said belt withdrawal direction, said mechanism being actuated upon the occurrence of the vehicle collision, a portion of said length of seat belt webbing restraining movement of said seat back portion relative to the vehicle during the vehicle collision.

2. The apparatus as defined in claim 1 wherein said length of seat belt webbing extends through a part of said seat back portion to said seat belt retractor, said seat belt retractor being surrounded by said part of said seat back portion.

3. The apparatus as defined in claim 1 further including a ring through which said portion of said length of seat belt webbing extends, said ring being fixed to said vehicle seat.

4. The apparatus as defined in claim 1 further including a turning loop for guiding said length of seat belt webbing, said turning loop being adapted to be fixed to the vehicle adjacent a first side of said vehicle seat.

5. The apparatus as defined in claim 4 further including a buckle for anchoring said length of seat belt webbing on a second side of said vehicle seat opposite said first side.

6. An apparatus for helping to protect an occupant of a vehicle, said apparatus comprising:

a vehicle seat having a seat back portion for engaging the body of the occupant of the vehicle, said vehicle seat further having an internal frame and a cushion surrounding said internal frame, said internal frame including a base frame element and a back frame element;

a length of seat belt webbing for extending around a portion of the occupant and for helping to protect the occupant upon the occurrence of a vehicle collision;

a seat belt retractor for biasing said length of seat belt webbing in a belt retraction direction, said seat belt retractor allowing said length of seat belt webbing to move in a belt withdrawal direction when a predetermined force is applied to said length of seat belt webbing, said belt withdrawal direction being opposite said belt retraction direction, said seat belt retractor being fixedly secured to the base frame element, said seat belt retractor being associated with a first end of said length of seat belt webbing;

an anchor for fixing a second end of said length of seat belt webbing to the vehicle, said second end of said length of seat belt webbing being opposite said first end;

a guide ring for guiding said length of seat belt webbing and for maintaining a portion of said length of seat belt webbing in a position rearward of said back frame element, said guide ring being fixedly secured to said back frame element; and a mechanism to block movement of said length of seat belt webbing in said belt withdrawal direction, said mechanism being actuated upon the occurrence of the vehicle collision, said portion of said length of seat belt webbing resisting movement of said seat back portion of said vehicle seat in a rearward direction relative to the vehicle during the vehicle collision, said length of seat belt webbing further resisting movement of the vehicle occupant forward in the vehicle.

7. The apparatus as define in claim 6 further including a turning loop for guiding said length of seat belt webbing, said turning loop being adapted to be fixed to the vehicle adjacent a first side of said vehicle seat, and said seat belt retractor being fixedly secured to said base frame element adjacent a second side of said vehicle seat opposite said first side.

8. The apparatus as defined in claim 6 further including a buckle for anchoring said length of seat belt webbing to the vehicle on said second side of said vehicle seat.

* * * * *